US009325901B2

(12) United States Patent
Shinagawa

(10) Patent No.: US 9,325,901 B2
(45) Date of Patent: Apr. 26, 2016

(54) IMAGE OUTPUT APPARATUS, IMAGE OUTPUT METHOD, AND CONTROL PROGRAM

(75) Inventor: Kazutaka Shinagawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 447 days.

(21) Appl. No.: 13/124,102

(22) PCT Filed: Oct. 20, 2009

(86) PCT No.: PCT/JP2009/005471
§ 371 (c)(1),
(2), (4) Date: Apr. 13, 2011

(87) PCT Pub. No.: WO2010/047085
PCT Pub. Date: Apr. 29, 2010

(65) Prior Publication Data
US 2011/0205374 A1 Aug. 25, 2011

(30) Foreign Application Priority Data

Oct. 22, 2008 (JP) ................. 2008-272132

(51) Int. Cl.
H04N 5/232 (2006.01)
H04N 1/32 (2006.01)
(Continued)

(52) U.S. Cl.
CPC ....... H04N 5/23293 (2013.01); H04N 1/32128 (2013.01); H04N 5/765 (2013.01); H04N 5/907 (2013.01); H04N 9/8205 (2013.01); H04N 2201/3216 (2013.01);
(Continued)

(58) Field of Classification Search
CPC .......... H04N 5/23293; H04N 1/32128; H04N 5/765; H04N 2201/3247; H04N 2201/3277; H04N 2201/3243; H04N 9/8205; H04N 2201/3216; H04N 5/907
USPC ...................................... 348/231.5
See application file for complete search history.

(56) References Cited

U.S. PATENT DOCUMENTS 5,703,701 A * 12/1997 Yamamoto et al. ........... 358/487
5,903,309 A * 5/1999 Anderson ................ 348/333.02
(Continued)

FOREIGN PATENT DOCUMENTS

JP 11-317833 A 11/1999
JP 2002-305713 A 10/2002
(Continued)

Primary Examiner — Jason Flohre
(74) Attorney, Agent, or Firm — Canon USA, Inc. IP Division

(57) ABSTRACT

An image output apparatus is capable of performing index outputting in which reduced images obtained from a plurality of image files are arranged and output. The image output apparatus includes a setting information storage unit configured to store setting information for the index outputting, the setting information being applied to a first-type image file including a plurality of pieces of image data among a plurality of image files as a target of the index outputting, a selecting unit configured to select a piece of image data added with specific information in the setting information from among the plurality of pieces of image data in the first-type image file when an image file as a target of the index outputting is the first-type image file, and an output unit configured to perform the index outputting on the basis of pieces of image data including the selected piece of image data.

13 Claims, 18 Drawing Sheets

(51) Int. Cl.
*H04N 5/765* (2006.01)
*H04N 9/82* (2006.01)
*H04N 5/907* (2006.01)

(52) U.S. Cl.
CPC ............. *H04N 2201/3243* (2013.01); *H04N 2201/3247* (2013.01); *H04N 2201/3277* (2013.01)

(56) References Cited

U.S. PATENT DOCUMENTS

| | | | | |
|---|---|---|---|---|
| 6,795,212 | B1* | 9/2004 | Ichikawa | 358/1.9 |
| 6,806,978 | B1* | 10/2004 | Tamura et al. | 358/1.15 |
| 7,042,504 | B1* | 5/2006 | Toyofuku et al. | 348/231.1 |
| 2002/0063709 | A1* | 5/2002 | Gilbert et al. | 345/427 |
| 2003/0169349 | A1* | 9/2003 | Aoi et al. | 348/231.2 |
| 2003/0227468 | A1* | 12/2003 | Takeda | 345/619 |
| 2004/0141211 | A1* | 7/2004 | Furukawa | 358/450 |
| 2004/0169742 | A1* | 9/2004 | Shibutani et al. | 348/231.5 |
| 2005/0128510 | A1* | 6/2005 | Campbell | 358/1.15 |
| 2009/0207279 | A1* | 8/2009 | Ochi et al. | 348/231.99 |
| 2009/0245643 | A1* | 10/2009 | Hasegawa et al. | 382/181 |
| 2010/0220198 | A1* | 9/2010 | Aoyama et al. | 348/207.2 |

FOREIGN PATENT DOCUMENTS

| | | | |
|---|---|---|---|
| JP | 2003-219325 A | | 7/2003 |
| JP | 2004-013575 A | | 1/2004 |
| JP | 2004-295231 A | | 10/2004 |
| JP | 2005-348448 A | | 12/2005 |
| JP | 2006-020346 A | | 1/2006 |
| JP | 2006-166407 A | | 6/2006 |
| JP | 2008-236454 A | | 10/2008 |
| JP | 2009-253446 A | | 10/2009 |
| WO | WO 2008087914 A1 | * | 7/2008 |

* cited by examiner

FIG. 6

| | MIF SETTINGS | |
|---|---|---|
| 602 — NUMBER OF OUTPUT IMAGES | | 1 |
| 603 — REPRESENTATIVE FLAG PRIORITY | | ON |
| 604 — FRAME | | ON |
| 605 — FILE NAME | | ON |

601

IMAGE OUTPUT APPARATUS, IMAGE OUTPUT METHOD, AND CONTROL PROGRAM

TECHNICAL FIELD

The present invention relates to an image output apparatus that performs index outputting so that content of a plurality of pieces of image data can be shown in a list.

BACKGROUND ART

Along with recent popularization of digital cameras, so-called direct printing, in which image data is directly transferred to a printing apparatus without using a host computer (personal computer) and is printed after data processing has been performed thereon in the printing apparatus, has become popular. In the direct printing, a digital camera is connected to a printing apparatus, and then the printing apparatus accesses a memory card in the digital camera, reads image data recorded on the memory card, and prints the image data. Alternatively, the memory card may be inserted into a card slot of the printing apparatus, so that the printing apparatus can read and print the image data recorded on the memory card.

Also, index printing, in which a plurality of small-sized images (reduced images or thumbnail images) are printed while being arranged on a printing sheet, and index display, in which a plurality of thumbnail images are displayed while being arranged on an operation screen, have been realized (hereinafter, index printing and index display are collectively called "index outputting"). In the index outputting, a plurality of arranged thumbnail images are output so that a plurality of pieces of image data recorded on a memory card or the like can be listed. By viewing the index, a user can check the content of images recorded on the memory card or can check desired images. Furthermore, by selecting desired images in a method provided by a printing apparatus, the user can print only necessary images among all the images recorded on the memory card.

According to PTL 1, a file for index printing can be selected based on a plurality of files and associated information thereof.

According to PTL 2, a plurality of files can be combined into a group, and a display layout can be controlled in units of groups.

In PTL 1 and PTL 2, however, an image data file including only a piece of image data to be selected is used as a target. In a case where an image data file including a plurality of pieces of image data is used as a target of index outputting, pieces of image data to be output are not appropriately selected.

Further, in a case where a plurality of images to be output as an index are selected from a file, it is difficult for the user to determine whether the plurality of images belong to the same file.

Still further, in a case where a plurality of images in a file are to be output as an index, it is difficult for the user to determine a relationship between the images.

CITATION LIST

Patent Literature

[PTL 1]
Japanese Patent Laid-Open No. 2006-020346
[PTL 2]
Japanese Patent Laid-Open No. 2004-295231

Summary of Invention

Features of the present invention will become apparent from the following description of exemplary embodiments with reference to the attached drawings.

BRIEF DESCRIPTION OF DRAWINGS

FIG. 6 illustrates an example of MIF settings in the first example of index outputting.

DESCRIPTION OF EMBODIMENTS

Hereinafter, an embodiment of the present invention is described with reference to the attached drawings.

Figure 1:
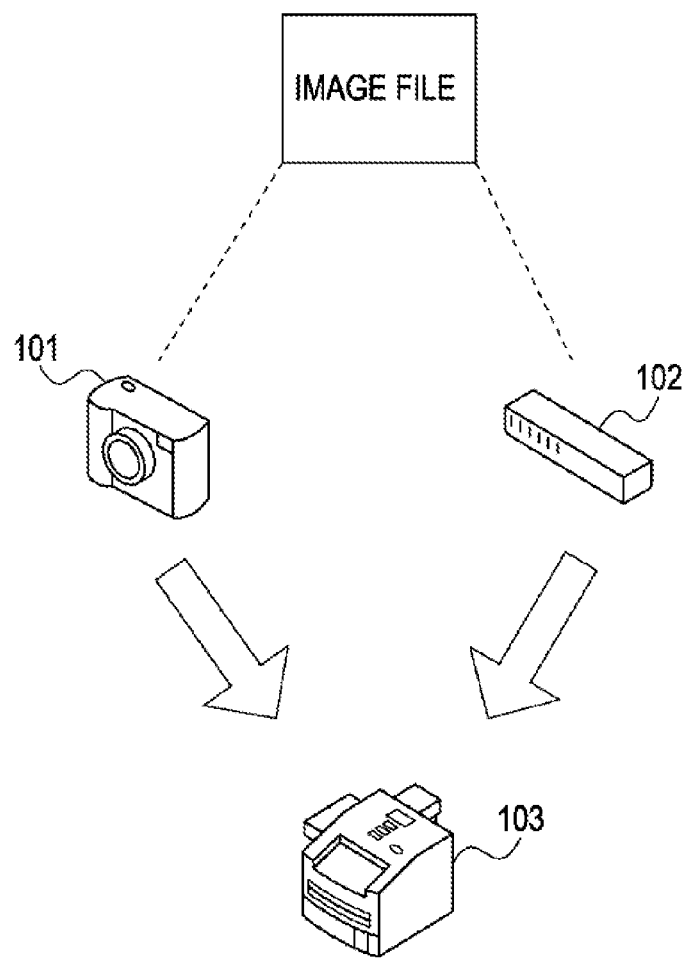
FIG. 1 illustrates an example of a system configuration including an image output apparatus and storage devices.

FIG. 1 illustrates an example of a system configuration including an image output apparatus and storage devices according to this embodiment of the present invention.

The system illustrated in FIG. 1 includes a digital camera 101 and a removable medium 102, which are examples of an image file storage device that stores an image file, and an image output apparatus 103 that processes the image file. Image file storage devices other than the digital camera 101 and the removable medium 102 may also be used, as long as the devices have a function of storing an image file. Examples of the removable medium 102 may include a USB (Universal Serial Bus) memory and various types of memory cards.

The image output apparatus 103 according to this embodiment is capable of executing direct printing and index printing. The image output apparatus 103 has an image processing function of converting an image file received from an image file storage device into print data. Also, the image output apparatus 103 may be capable of executing printout on the basis of an image file received via a network (not illustrated). Also, the image output apparatus 103 may be a digital MFP (Multifunction peripheral) having a plurality of functions, such as functions of scan, copy, FAX, and print.

Figure 2:
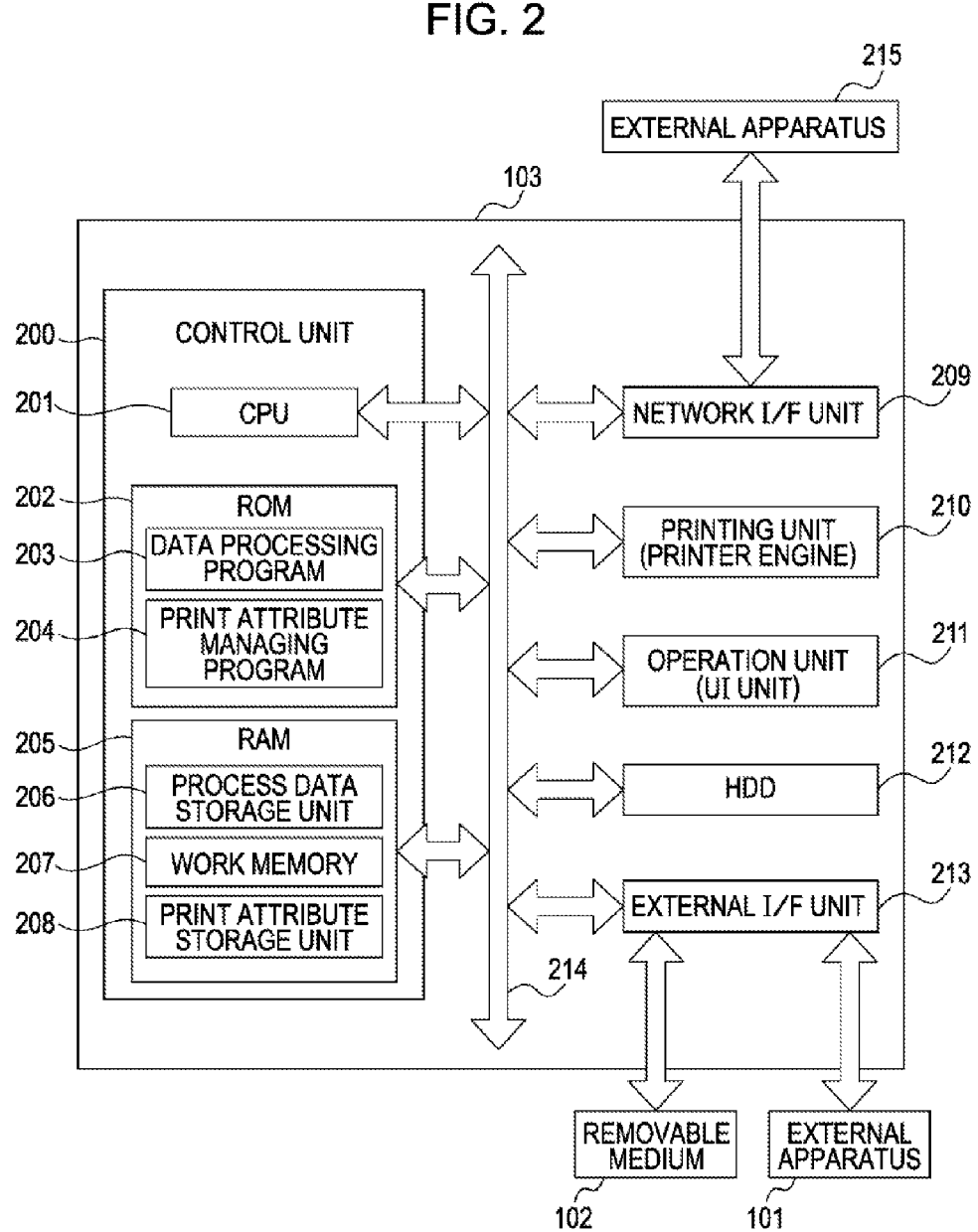
FIG. 2 is a block diagram illustrating an example of a hardware configuration of the image output apparatus according to an embodiment.

FIG. 2 is a block diagram illustrating an example of a hardware configuration of the image output apparatus 103 according to this embodiment.

A CPU (Central Processing Unit) 201 executes a control program stored in an ROM (Read Only Memory) 202 and controls various devices connected to a system bus 214. The ROM 202 stores a data processing program 203 for performing various processes on input image data. Also, the ROM 202 stores a print attribute managing program 204 for managing attributes that determine the behavior of the data processing program 203. The print attribute managing program 204 manages MIF (Multi-Image File) settings described below.

A process data storage unit 206 in a RAM (Random Access Memory) 205 is an area for storing process data used by the CPU 201 to execute the data processing program 203. A work memory 207 is a memory area that is temporarily used when the CPU 201 executes the data processing program 203. A print attribute storage unit 208 is an area for storing data managed by the print attribute managing program 204 (e.g. MIF settings described below). Therefore, the RAM 205 is an example of a setting information storage device for storing setting information used to perform index outputting. The CPU 201, the ROM 202, and the RAM 205 constitute a control unit 200.

A network interface (I/F) unit 209 is an interface unit for connecting the image output apparatus 103 to a network. In the example illustrated in FIG. 2, the image output apparatus 103 is connected to an external apparatus 215 via the network interface unit 209. An image file stored in the external apparatus 215 is transferred via a network and is received by the network interface unit 209.

A printing unit 210 is a printer engine that prints out print data on which image processing has been performed along the data processing program 203 executed by the CPU 201. The printing unit 210 performs printout in accordance with an electrophotography method or an inkjet method according to a related art. An operation unit 211 displays statuses of the image output apparatus 103 and the printing unit 210 and accepts an operation input from a user. The operation unit 211 includes a display unit, such as an LCD (Liquid Crystal Display), and an operation input unit including hard keys or a touch panel integrated with the display unit. Also, the operation unit 211 displays a status of connection with an external apparatus (215 or 101) or the removable medium 102 and data stored in the connected apparatus, and accepts selection of data or execution of an operation performed by a user. A hard disk 212 is a nonvolatile storage device that stores various data for a long time, not temporarily. An external interface (I/F) unit 213 is an interface for transmitting/receiving data to/from the removable medium 102 or the external apparatus 101. In this embodiment, a USB interface is used as the external interface unit 213, but another interface of IEEE 1394 or the like may also be used. Furthermore, an interface for wireless communication, such as Bluetooth or TransferJet, may also be used.

The hardware configuration illustrated in FIG. 2 is only an example. The network interface unit 209 is not necessary if image data is transmitted to/received from an external apparatus only through direct connection, not through network connection, for example. Also, part of the configuration illustrated in FIG. 2 may be omitted, or a device not illustrated in FIG. 2 may be further provided depending on cases.

Figure 3:
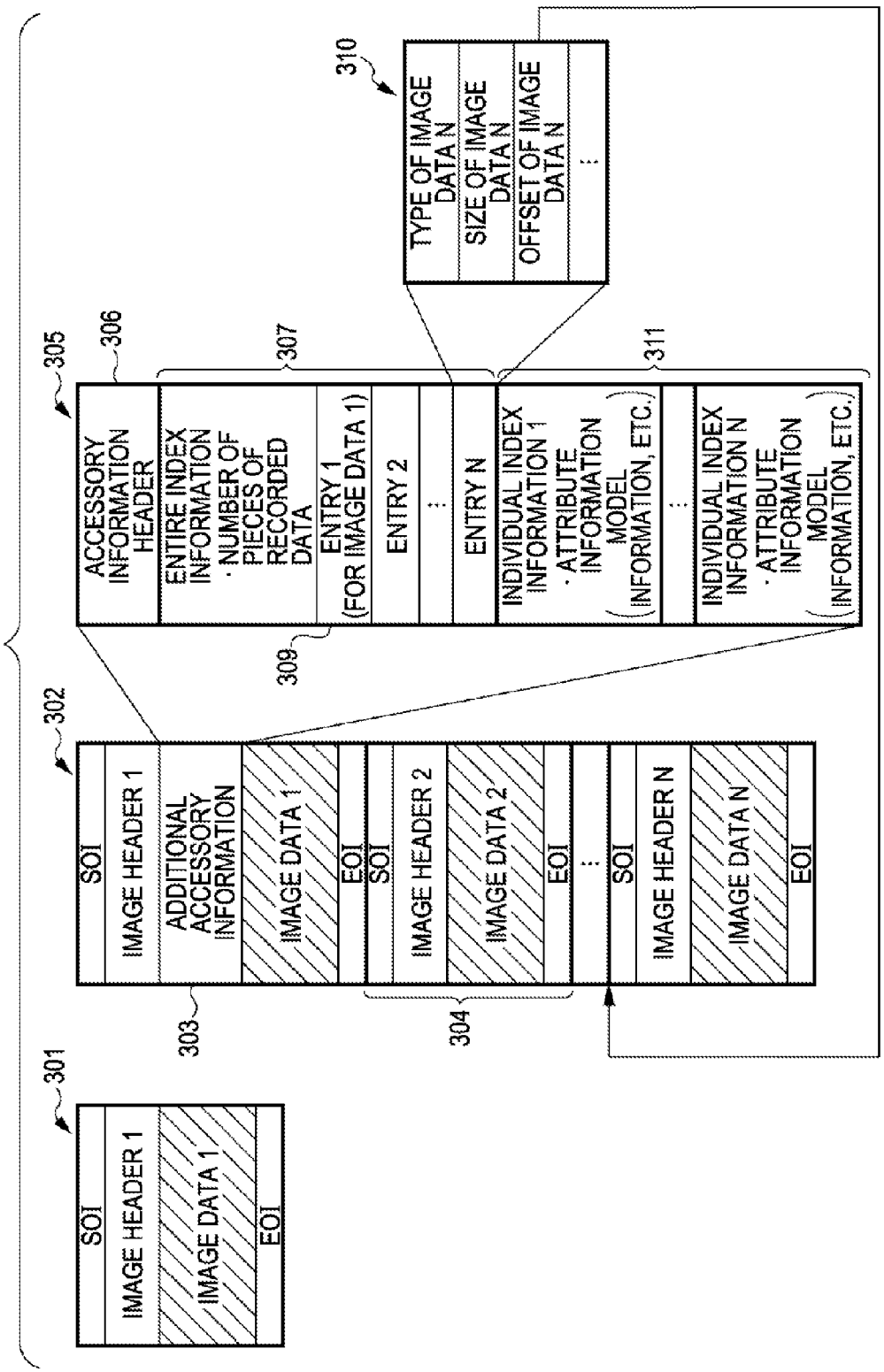
FIG. 3 illustrates an example of a format of image files handled by the image output apparatus.

FIG. 3 illustrates an example of a format of image files handled by the image output apparatus 103 according to this embodiment.

In this embodiment, an image file including a single piece of image data (e.g., JPEG (Joint Photographic Experts Group) file) is called a normal image file; whereas an image file including a plurality of pieces of image data is called a multi-image file (hereinafter MIF).

In a normal image file 301, an image header 1 and image data 1 are stored in an area sandwiched between an SOI (Start Of Image) marker and an EOI (End Of Image) marker.

An MIF 302 stores a plurality of pairs of an image header and image data. Each of the plurality of images is called an individual image. In the MIF 302 including a plurality of pieces of image data, not a single piece of image data, additional accessory information 303 is provided in an area between an image header 1 and image data 1. Data 304 stored in the MIF 302 has the same configuration as that of the image file 301, that is, an image header 2 and image data 2 are stored in an area sandwiched between an SOI marker and an EOI marker. In image headers 1 to N, thumbnails (reduced images) of corresponding pieces of image data 1 to N may be stored, respectively.

Reference numeral 305 denotes details of the additional accessory information 303. The additional accessory information 303 includes an accessory information header 306, entire index information 307, and pieces of individual index information 1 to N denoted by 311. The entire index information 307 includes the number of pieces of recorded data that indicates the number of pieces of image data stored in the image file, and entry information of individual pieces of stored data (e.g., entry 1 denoted by 309). Also, the individual index information 311 includes attribute information, such as model information.

Reference numeral 310 denotes the content of the entry N in the entire index information 307. The entry N includes data type information indicating that the data is normal image data, data of different resolution, or the like. Also, the entry N includes a data size and an offset value.

Now, attribute information handled in an MIF will be described. As attribute information for an MIF, there are provided an initial flag and a representative flag used for selecting one of pieces of image data in the MIF. The initial flag indicates the piece of image data at the top of an MIF among a plurality of pieces of image data in the MIF. If an MIF is displayed in an image output apparatus incapable of handling an MIF, only an initial image in which the initial flag is set is displayed. On the other hand, the representative flag is set for a representative image among the images except the initial image.

The attributes used for selecting a plurality of appropriate pieces of image data from an MIF include a child-flag-deletion flag, a simplified deletion flag, and a parent-child display flag. It is assumed that an MIF enables a plurality of pieces image data in the MIF to have a correlation, such as a parent-child relationship. Information indicating a child image is provided for an image as a child, and a child-image flag including a pointer of an image as a parent is set to an individual entry of the child image, whereby a parent-child relationship between pieces of image data can be specified. The child-flag-deletion flag indicates that a parent-child relationship can be set as an attribute of image data included in the MIF and that the image data set as a child is not output as an index when the parent-child relationship actually exists. The child-flag-deletion flag is set for a child image. The simplified deletion flag is used for not selecting, as image data for index outputting, all pieces of image data after the piece of image data in which the simplified deletion flag is set. The parent-child display flag indicates that display for expressing a parent-child relationship is performed when thumbnails having a parent-child relationship are displayed.

Furthermore, an individual type attribute indicating the type of image included in the MIF is provided. The individual type is a type indicating a special image that can be set in the MIF. Examples of the individual type include a multi-view image, a continuous-shooting image, a panorama image, and an image having a resolution different from that of another image.

In this embodiment, the foregoing flags and attributes are stored in the individual entry 310 or the individual index information 311. Alternatively, the flags and attributes may be stored in the respective image headers in the MIF 302. The internal data and format of the image files illustrated in FIG. 3 are only examples, and the present invention is not limited to those examples.

Hereinafter, examples of index outputting performed by the image output apparatus 103 according to this embodiment are described.

First Example Of Index Outputting

A first example of index outputting performed by the image output apparatus 103 is described. Here, a description is given about an index printing operation performed by the image output apparatus 103 on the basis of image data in an image file stored in an image file storage device (a memory in the digital camera 101 or the removable medium 102). It is assumed that a normal image file (JPEG file or the like) and an MIF are stored in mixture in the image file storage device. Also, it is assumed that initial settings of the image output apparatus 103 or settings by a user are made for setting information for index outputting of an MIF (MIF settings described below). In the first example of index outputting, a piece of image data for index outputting is selected from among a plurality of pieces of image data in an MIF when the MIF is selected as an index outputting target file by user setting. An example of the selected piece of image data is an image with a representative flag.

Figure 4:
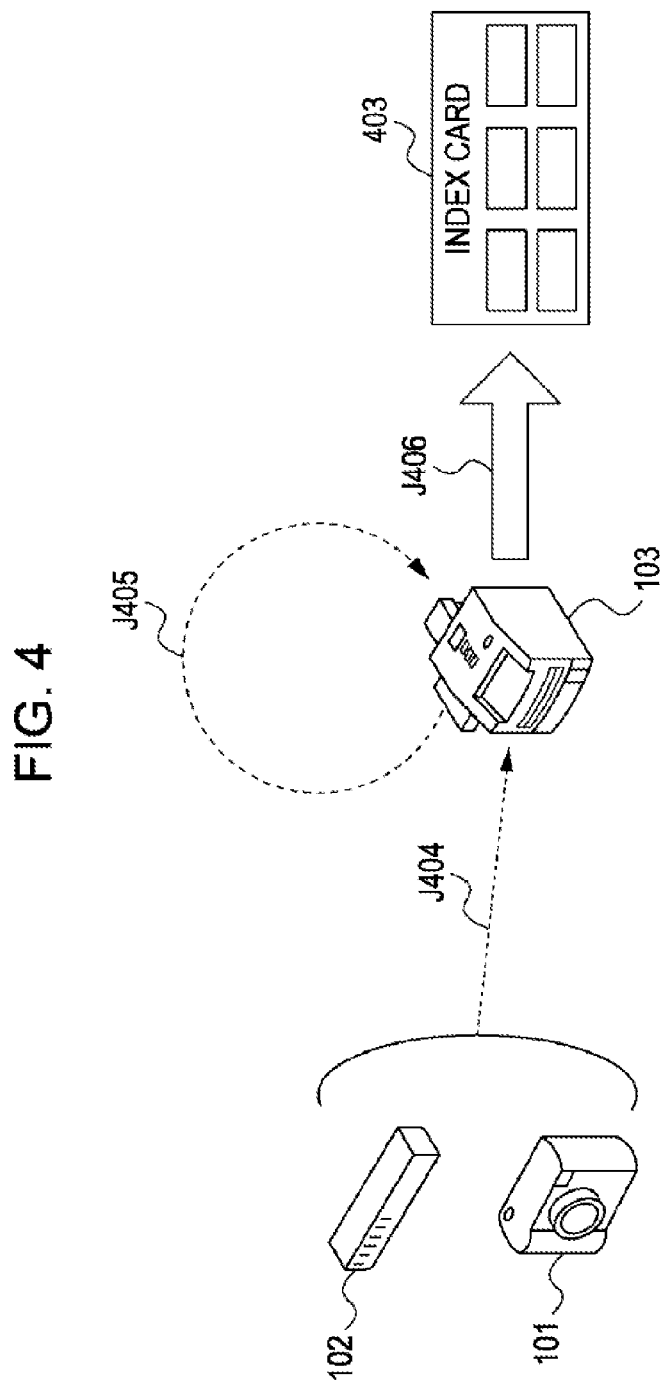
FIG. 4 illustrates a process outline in a first example of index outputting.

FIG. 4 illustrates a process outline of the first example of index outputting. Hereinafter, a description is given about a case of outputting an image file stored in the memory of the digital camera 101. Also, this example can be applied to a case of outputting an index of an image file stored in the removable medium 102.

Figure 5:
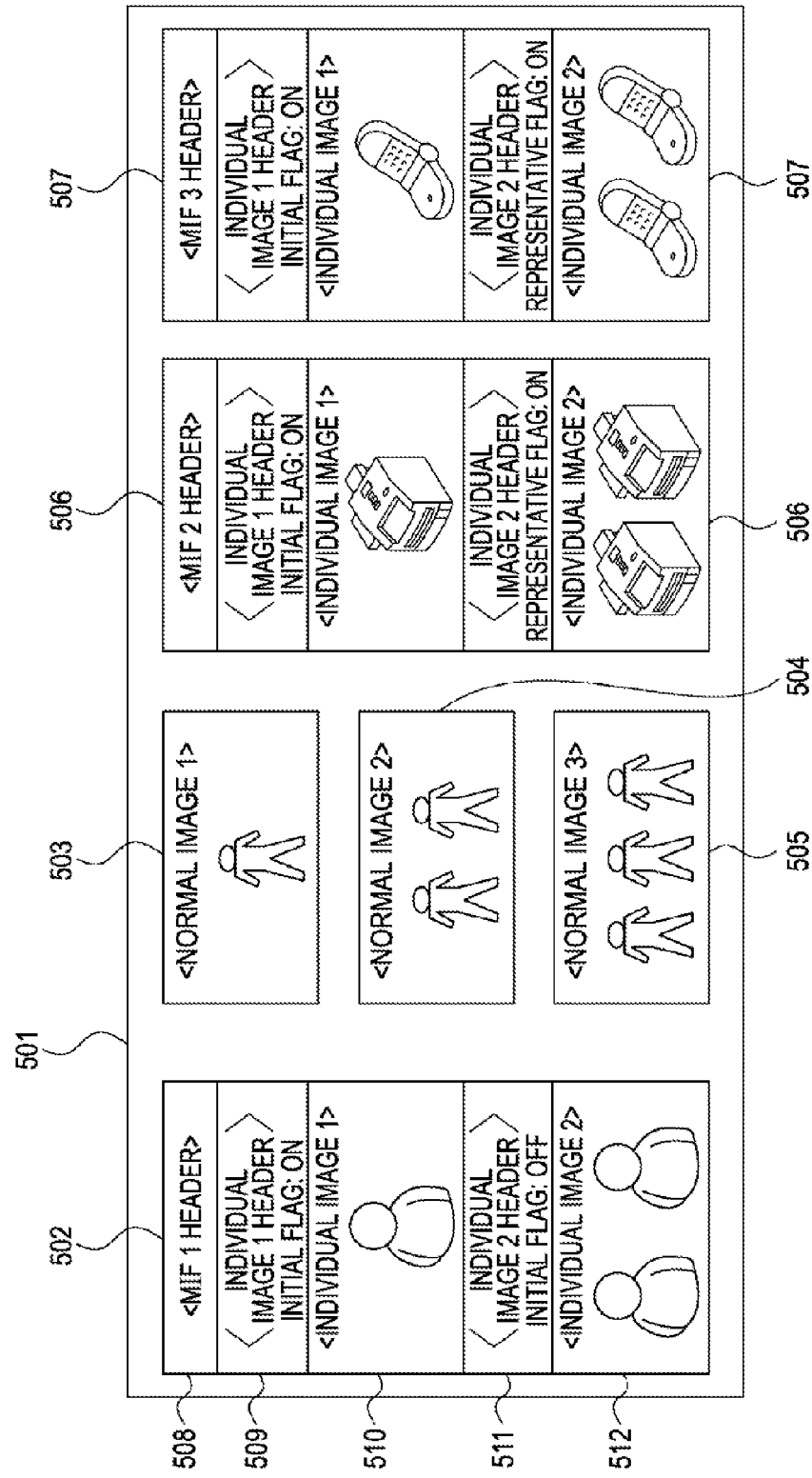
FIG. 5 illustrates a storage example of image files in an image file storage device in the first example of index outputting.

FIG. 5 illustrates a storage example of image files in an image file storage device. Here, the memory of the digital camera 101 is used as an example of the image file storage device.

In the first example of index outputting, it is assumed that six image files including normal image files 503, 504, and 505 and MIFs 502, 506, and 507 are stored in the memory 501 in the digital camera 101. The MIF 502 includes an MIF 1 header 508, an individual image 1 header 509, an individual image 2 header 511, individual image 1 data 510, and individual image 2 data 512. In the individual image headers, an attribute value is held at a part different from that in FIG. 3 for easy understanding. Each of the MIFs 506 and 507 has the same configuration as that of the MIF 502.

A user connects the digital camera 101 to the image output apparatus 103 and allows index printing to be performed by using the operation unit 211 of the image output apparatus 103 (J404). The image output apparatus 103 reflects MIF settings 601 (FIG. 6), performs image processing on a target image file on the basis of the settings, and generates image data for index printing (J405). Finally, the image output apparatus 103 prints the processed image data to generate an index card 403 and outputs it (J406).

FIG. 6 illustrates an example of the MIF settings. Specifically, the MIF settings 601 include a setting 602 for the number of output images indicating the number of images selected as an image for index outputting from an MIF when a target file of the index printing is an MIF. Also, the MIF settings 601 include a setting 603 for preferentially selecting an image provided with a representative flag as target image data for index outputting. Furthermore, the MIF settings 601 include a setting 604 for adding frames around thumbnails (reduced images) so that it can be recognized that a plurality of pieces of image data are included in the MIF for index outputting, and a setting 605 for changing a method for outputting file names so that it can be recognized that there are a plurality of pieces of image data. Alternatively, a setting for displaying a parent-child relationship, a setting for simplified deletion, and a setting for a file type may be provided as other setting items.

Figure 7:
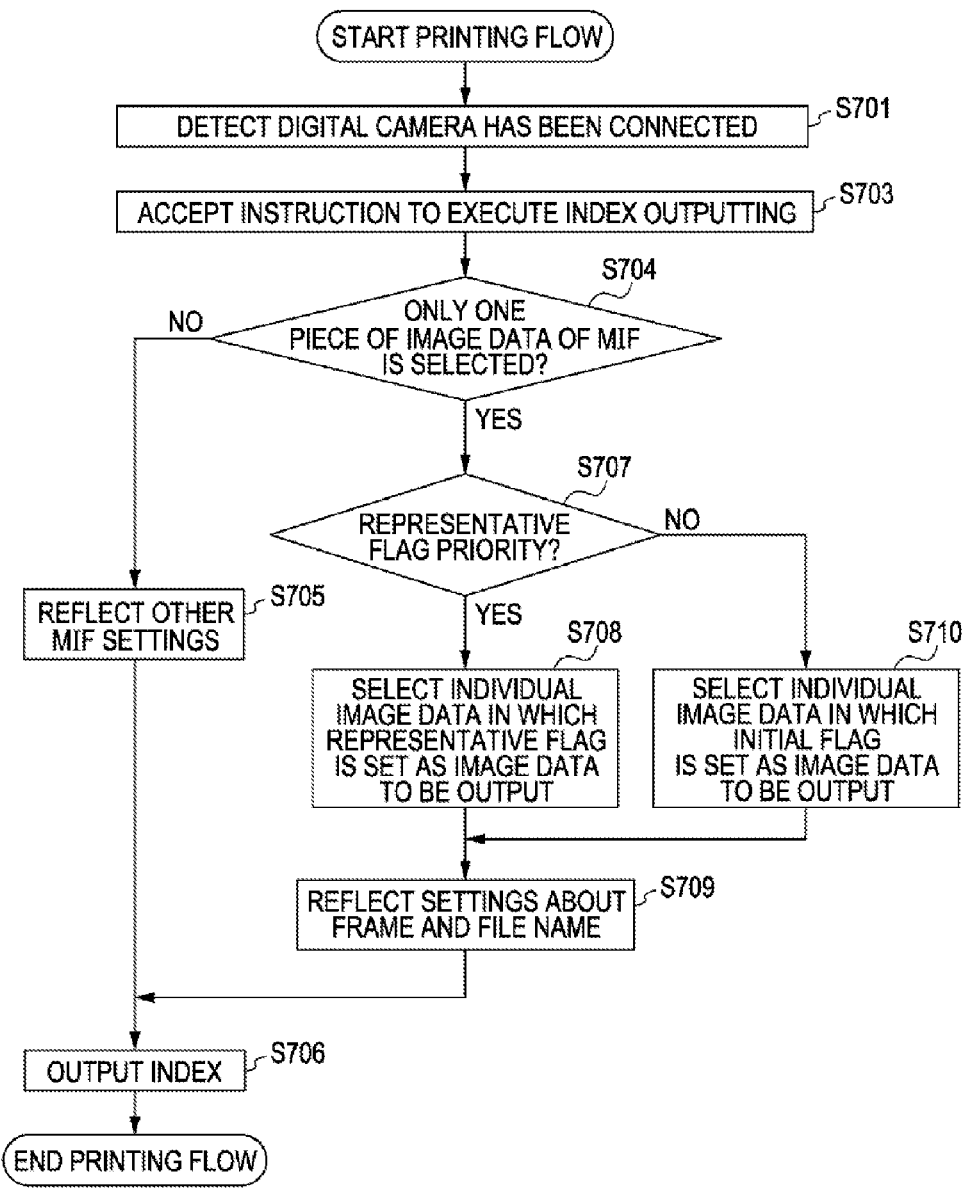
FIG. 7 is a flowchart illustrating a process performed by the image output apparatus in the first example of index outputting.

FIG. 7 is a flowchart illustrating a process performed by the image output apparatus 103 in the first example of index outputting illustrated in FIG. 4. The process of this flowchart is executed by the CPU 201 of the image output apparatus 103.

In step S701, in a state where the image files 502 to 507 exist in the memory of the digital camera 101, it is detected that the digital camera 101 has been connected to the image output apparatus 103, and the process proceeds to step S703. Step S701 corresponds to the foregoing J404.

In step S703, execution of index outputting starts. Specifically, the user provides an instruction to execute index outputting by using the operation unit 211, and the image output apparatus 103 accepts the instruction, whereby the execution starts. Then, the process proceeds to step S704.

In step S704, it is determined whether only a piece of image data for index outputting is to be selected or a plurality of pieces of image data are to be selected in accordance with the setting 602 for the number of output images in the MIF settings 601 when a target image file is an MIF. If the setting 602 for the number of output images is a setting for selecting a plurality of pieces of image data for index outputting in one MIF, the process proceeds to step S705. In step S705, the other settings in the MIF settings 601 are reflected, and the process proceeds to step S706. In step S706, index outputting onto a sheet is executed in accordance with the MIF settings 601.

On the other hand, if it is determined in step S704 that the setting 602 for the number of output images indicates "1", the process proceeds to step S707.

In step S707, it is determined whether priority should be put on a representative flag as a method for selecting an image to be output for an index among a plurality of images in the MIF. The representative flag can be freely set independently of the initial flag. By setting this flag to turn ON the setting 603 for representative flag priority, image data except the initial image can be selected as image data for index outputting. Even if the setting 603 for representative flag priority is "ON", the image data in which the initial flag is set is selected as image data for index outputting if there exists no image data in which the representative flag is set. When no priority is put on the representative flag, the process proceeds to step S710. In step S710, the image data in which the initial flag is set is selected as image data for index outputting, and the process proceeds to step S709. On the other hand, if the setting 603 for representative flag priority is "ON", the process proceeds to step S708. In step S708, the image data in which the representative flag is set is selected as image data for index outputting, and the process proceeds to step S709.

In step S709, the setting 604 for frames and the setting 605 for file names in the MIF settings 601 are reflected, regarding whether frames of thumbnails are to be printed and whether file names are to be printed.

In step S706, image data to be output as an index is generated on the basis of the reflected settings, and printout is performed. Steps S703 to S705 and steps S707 to S710 correspond to the foregoing J405.

Figure 8:
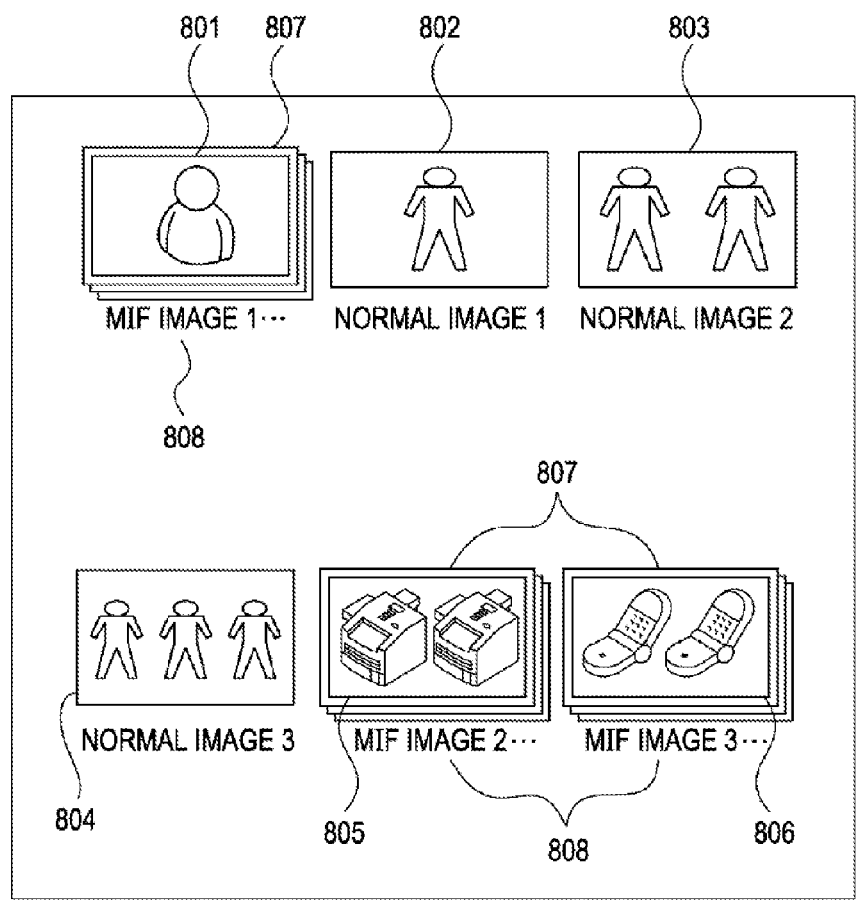
FIG. 8 illustrates an example of an output index in the first example of index outputting.

FIG. 8 illustrates an example of an output index. The selected pieces of image data are output as thumbnails 801 to 806. The thumbnails 802 to 804 are based on the pieces of normal image data 503 to 505 illustrated in FIG. 5 and are thus output as is. The thumbnails 801, 805, and 806 are based on the MIFs 502, 506, and 507 illustrated in FIG. 5. On the basis of the setting 602 for the number of output images, the number of output images in each of the MIFs 502, 506, and 507, each including two pieces of image data, is 1. In accordance with the setting 603 for representative flag priority determined in step S707 in FIG. 7, the individual image 1 is selected for the MIF 502, the individual image 2 is selected for the MIF 506, and the individual image 2 is selected for the MIF 507. Those images are output as the thumbnails 801, 805, and 806, respectively.

Frames 807 and file names 808 are output in accordance with the setting 604 for frames and the setting 605 for file names in the MIF settings 601. As for display of frames, multi-layer frames are formed around the thumbnail images in the MIFs, whereby existence of a plurality of pieces of image data is expressed. Also, as for display of file names. "..." is added after each file name, whereby existence of a plurality of pieces of image data is expressed. The frames and file names of the thumbnails 801, 805, and 806 are only an example, and other expressions may also be used. For example, the file names may be expressed as "MIF 1 and another image" or "MIF 1+1".

If there exists no image data in which the representative flag is set in step S708, the initial image may be selected as image data for index outputting.

As described above, according to the first example of index outputting, an image to be output as an index can be appropriately selected when an MIF includes a plurality of individual images. Also, in a case of performing index outputting of files including an MIF that includes a plurality of individual images, a user can be easily allowed to visually recognize the existence of the plurality of images in the MIF.

Second Example Of Index Outputting

Next, a second example of index outputting is described. In the second example of index outputting, as in the first example of index outputting, image data in image files stored in the image file storage device is output as an index.

The system configuration and the outline of execution in the second example of index outputting are the same as those in the first example of index outputting illustrated in FIG. 4.

Figure 9:
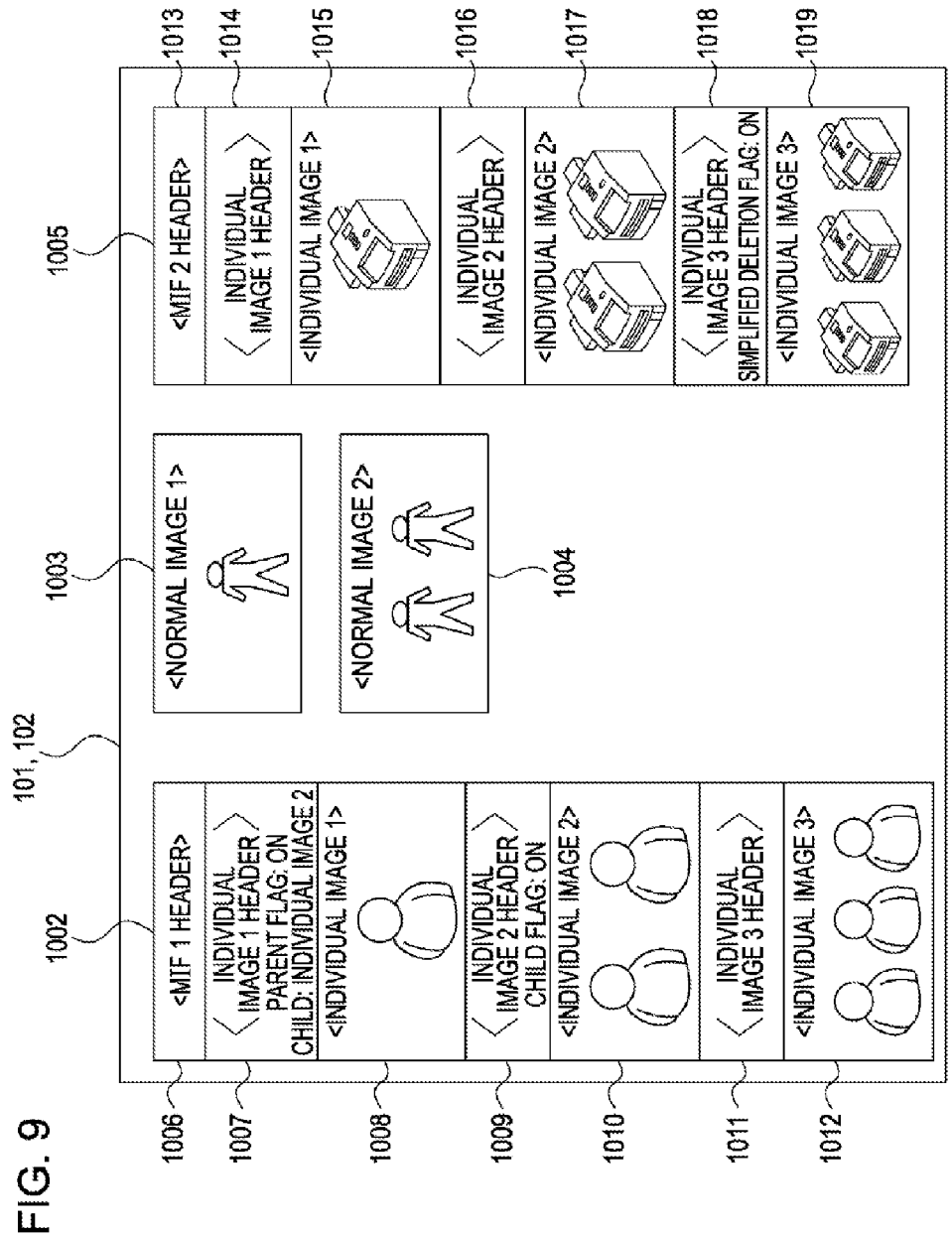
FIG. 9 illustrates a storage example of image files in an image file storage device in a second example of index outputting.

FIG. 9 illustrates an example of image files stored in the image file storage device (the removable medium 102 is used in this example).

In the second example of index outputting, four image files 1002 to 1005 are stored in the removable medium 102. Specifically, two of the image files are normal image files 1003 and 1004, and the other two image files are MIFs 1002 and 1005. The MIF 1002 includes an MIF 1 header 1006, an individual image 1 header 1007, an individual image 2 header 1009, an individual image 3 header 1011, individual image 1 data 1008, individual image 2 data 1010, and individual image 3 data 1012. In the individual image headers, an attribute value is held at a part different from that in FIG. 3 for easy understanding. The MIF 1005 has the same configuration as that of the MIF 1002.

Referring to FIG. 4, a user connects the removable medium 102 to the image output apparatus 103 and allows index printing to be executed by using the UI of the image output apparatus 103 (J404). After starting execution of index printing, the image output apparatus 103 reflects MIF settings 1101 (FIG. 10) serving as setting information to output an MIF as an index, performs image processing on a target image file on the basis of the settings, and generates image data for index printing (J405). In the second example of index outputting, the number of output images in the MIF settings 1101 starts from "1", and thus thumbnails are displayed in the same manner as in the first example of index outputting. A result of the display of thumbnails is presented to the user in the form of a preview image (J405). The user checks the preview image displayed in the operation unit 211 and allows an actual output if the preview image is a desired result (J406). If the preview image is not a desired result, the user repeats an operation of changing the MIF settings 1101 so as to allow the image output apparatus 103 to present a new preview image until a desired result can be obtained, and finally prints out the images to generate an index card (J406).

Figure 10:
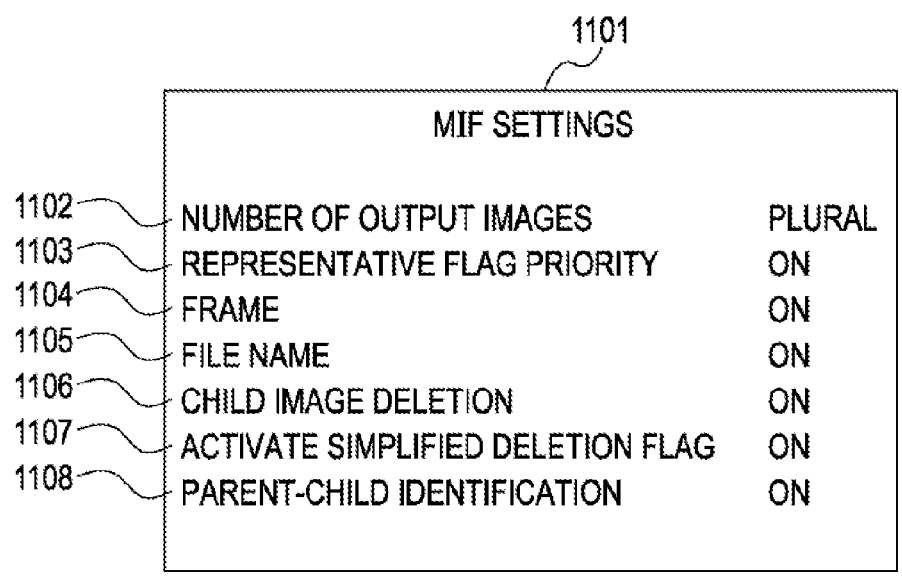
FIG. 10 illustrates an example of MIF settings in the second example of index outputting.

FIG. 10 illustrates an example of MIF settings in the second example of index outputting. The settings 1102 to 1105 are the same as the settings 602 to 605 illustrated in FIG. 6, and thus the description thereof is omitted. The settings not existing in FIG. 6 include a setting 1106 for child image deletion, a setting 1107 for activating simplified deletion flag, and a setting 1108 for parent-child identification. The setting 1106 for child image deletion is a setting for excluding image data set as "child" from a target of index outputting in a case where a parent-child relationship is set in individual images included in an MIF. The setting 1107 for activating simplified deletion flag is a setting for excluding image data after individual image data in which a simplified deletion flag is set in the individual image header of the MIF from a target of index outputting if such individual image data exists. The setting 1108 for parent-child identification is a flag for outputting an identifier representing a parent-child relationship in a case where an MIF includes image data having a parent-child relationship and where the setting 1106 for child image deletion is OFF, that is, where a child image is also output as an index.

Figure 11:
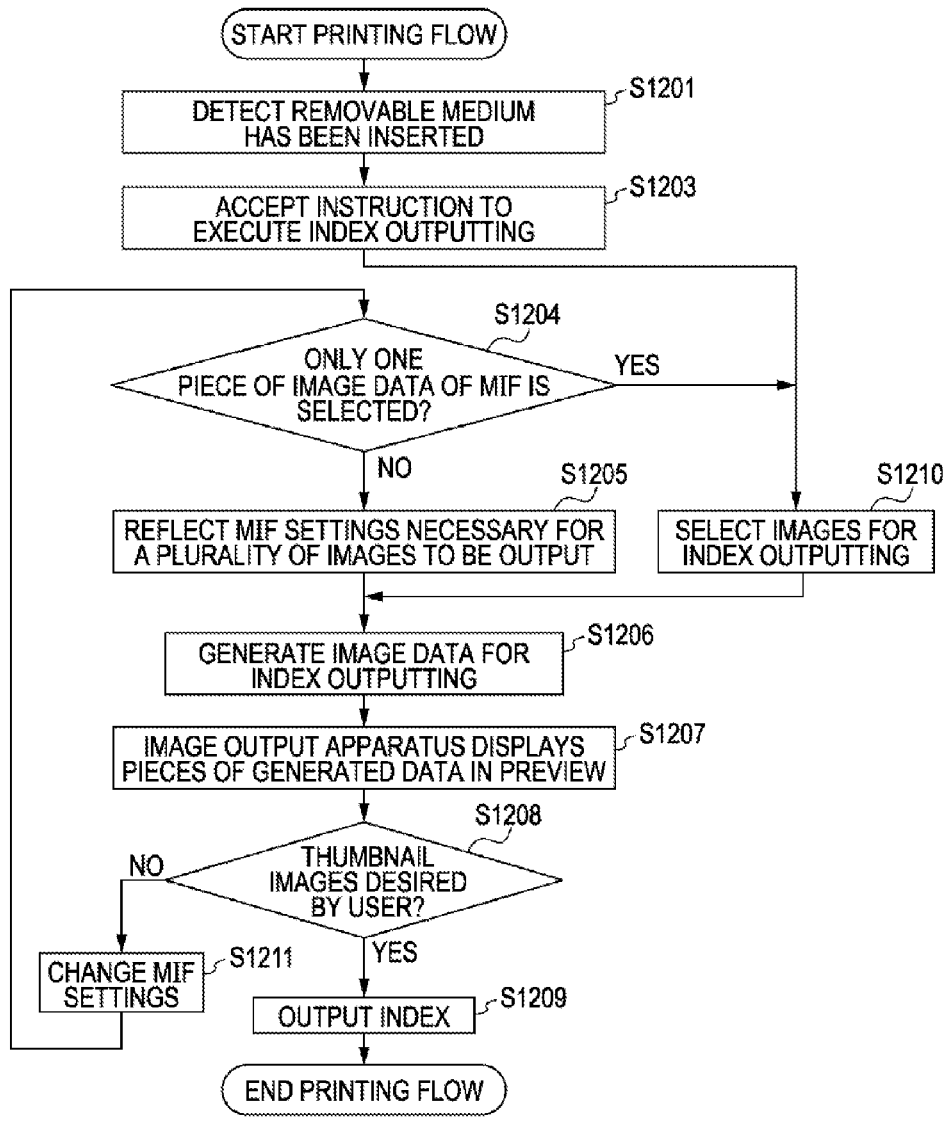
FIG. 11 is a flowchart illustrating a process performed by the image output apparatus in the second example of index outputting.

FIG. 11 is a flowchart illustrating an example of a process performed by the image output apparatus 103 in the second example of index outputting. The process of this flowchart is executed by the CPU 201 of the image output apparatus 103. First, in step S1201, a user inserts the removable medium 102 storing the image files 1002 to 1005 into the image output apparatus 103, so that the image output apparatus 103 detects the insertion. Step S1201 corresponds to the foregoing J404.

In step S1203, an instruction to start execution of index outputting is accepted from the user.

In step S1210, images to be output are selected in order to display a preview image of an index to be output in the operation unit 211. In the second example of index outputting, the number of selected images in an MIF is set to "1" regardless of the setting 1102 for the number of output images so that an image per file is displayed. In an MIF, image data in which the representative flag is set is selected as a piece of image data that should be selected. This is because it is considered that a user wants only an important image in an MIF to be displayed in many cases.

In step S1206, the image output apparatus 103 generates image data to be output of respective images, and the process proceeds to step S1207.

In step S1207, the image output apparatus 103 performs preview display of respective pieces of generated data in the operation unit 211, and the process proceeds to step S1208.

In step S1208, it is determined whether the presented preview display is desired by the user, and the user provides an instruction of "OK" or "NG" to the operation unit 211. When an input of "NG" is accepted from the user, the process proceeds to step S1211. On the other hand, when an input of "OK" is accepted from the user, the process proceeds to step S1209.

In step S1211, the MIF settings 1101 are changed. Specifically, for example, the MIF settings 1101 are displayed in the operation unit 211, an instruction to change the settings is accepted from the user via the operation unit 211, and the settings are changed. After the MIF settings 1101 have been changed, the process returns to step S1204, and a process of outputting an index is repeated.

In step S1204, a determination is made on the basis of the setting 1102 for the number of output images in the MIF settings 1101. If the user sets the number of output images in the MIF to plural, the process proceeds to step S1205.

In step S1205 the settings that are necessary when the number of output images in the MIF is plural are reflected. That is, the setting 1106 for child image deletion, the setting 1107 for activating simplified deletion flag, and the setting 1108 for parent-child identification are reflected.

Figure 12:
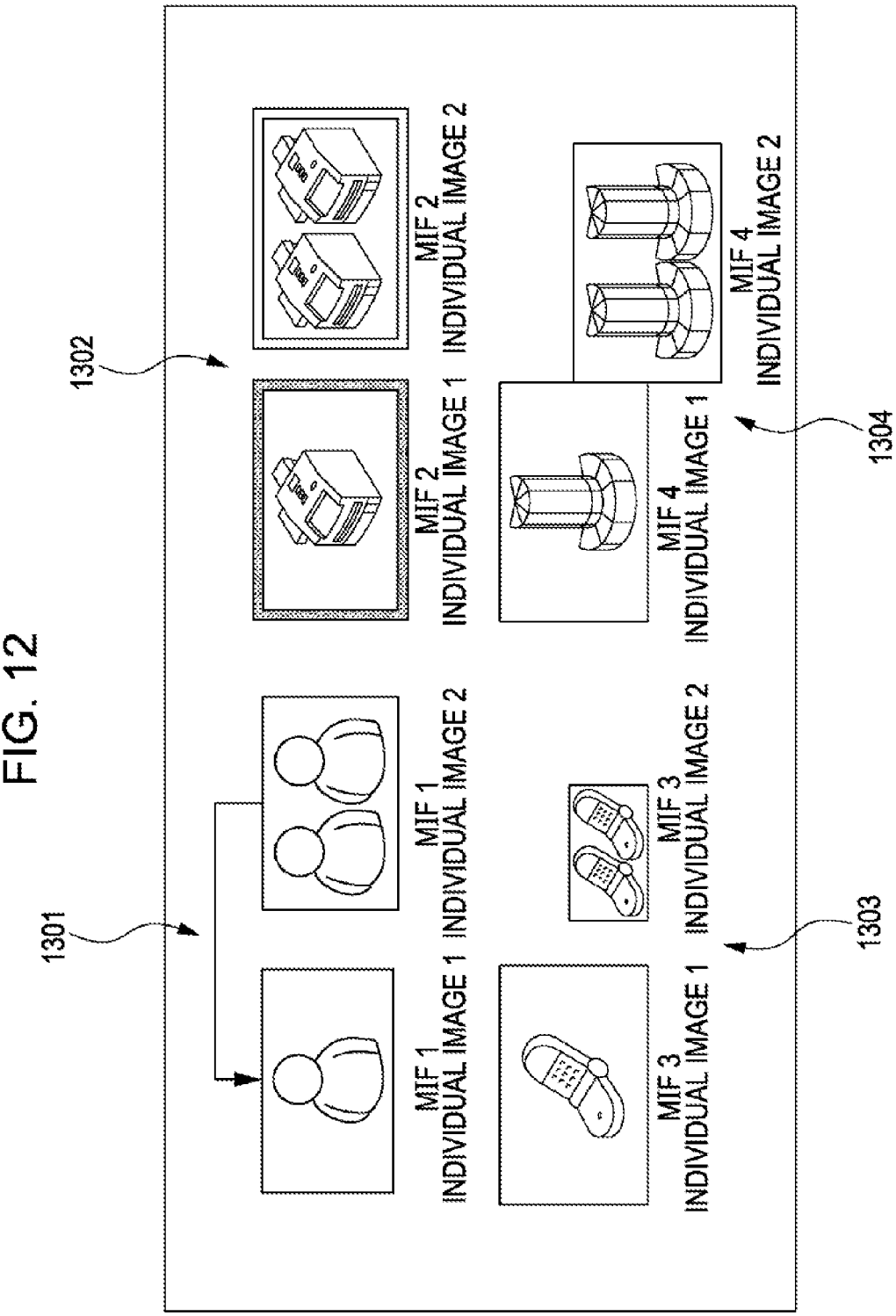
FIG. 12 illustrates an example of identifiers of a parent-child relationship expressed on an output index when parent-child identification is "ON".

FIG. 12 illustrates an example of parent-child relationship identifiers expressed on an output index when the setting 1108 for parent-child identification is "ON". A parent-child relationship is expressed by an arrow connecting images in an identifier 1301, by a display manner of frames in an identifier 1302, by different sizes of images in an identifier 1303, and by a layout of images in an identifier 1304. A plurality of expressions may be used, or the relationship may be expressed in another method. Those settings are reflected, and then the process proceeds to step S1208 via steps S1206 and S1207.

After an operation input of "OK" is accepted from the user in step S1208, the process proceeds to step S1209. Steps S1203 to S1208, S1210, and S1211 correspond to the foregoing J405.

In step S1209, image data for outputting of the respective image files displayed in preview is output as an index.

Figure 13:
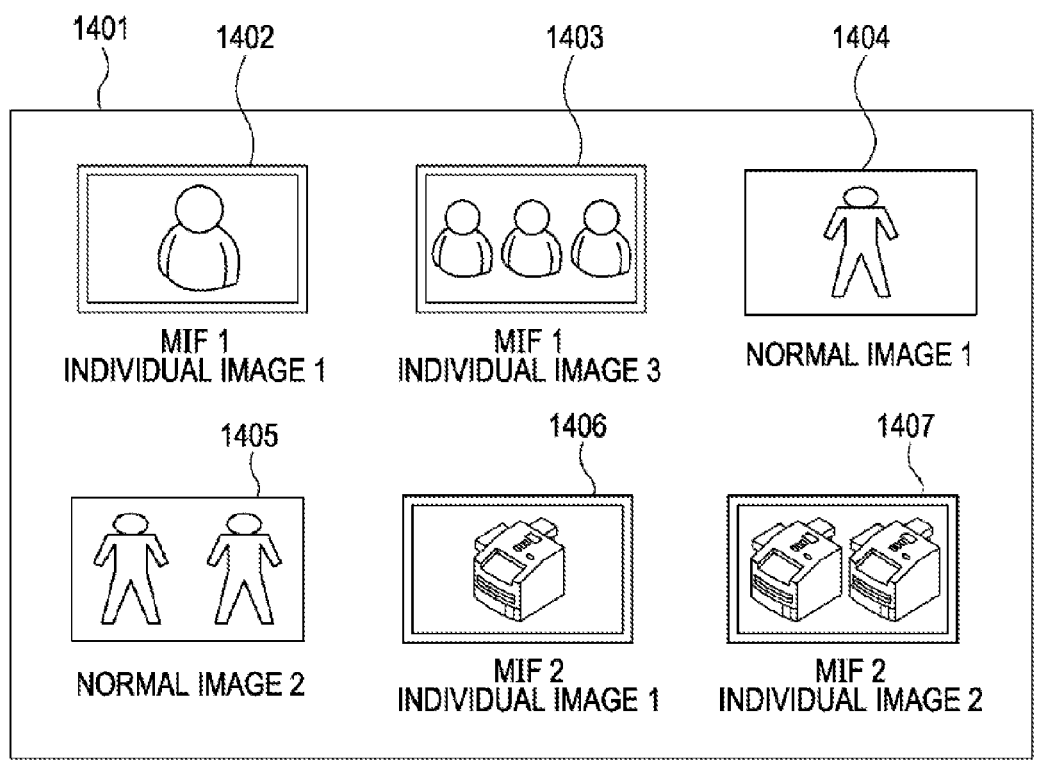
FIG. 13 illustrates an example of an output index in the second example of index outputting.

FIG. 13 illustrates an output index card 1401, which is an example of an output index. The selected pieces of image data are output as thumbnails 1402 to 1407. The thumbnails 1404 and 1405 are based on the normal image files 1003 and 1004 illustrated in FIG. 9 and are thus output as is. The thumbnails 1402 and 1403 are based on the images in the MIF 1002, whereas the thumbnails 1406 and 1407 are based on the images in the MIF 1005. Regarding the MIF 1002, the setting 1102 determined in step S1204 in FIG. 11 indicates that the number of output images is "plural" and the setting 1106 for child image deletion is "ON", so that the individual images 1 and 3 (1008 and 1012) are printed as the thumbnails 1402 and 1403, respectively. Furthermore, the setting 1104 for frames, the setting 1105 for file names, and the setting 1108 for parent-child identification are "ON", so that the display of frames, file names, and parent-child relationships are reflected on the output index. However, in the example illustrated in FIG. 13, the thumbnails 1402 and 1403 do not have a parent-child relationship, and the thumbnails 1406 and 1407 do not have a parent-child relationship. Therefore, an image for identifying a parent-child relationship is not added to those images. In the MIF 1005, the setting 1107 for activating simplified deletion flag is "ON", and thus the individual images 1 and 2 are displayed as the thumbnails 1406 and 1407.

As described above, according to the second example of index outputting, image data unnecessary to be output can be prevented from being output and image data can be output such that a relationship between pieces of the image data is identifiable in a case where an image file including a plurality of pieces of image data is to be output as an index.

Third Example Of Index Outputting

Next, a third example of index outputting is described. In this example, image data in image files stored in the image file storage-device is printed to generate an index mark sheet by using an index printing function of the image output apparatus 103. The index mark sheet is an index card provided with check fields. A user makes a check in a check field corresponding to a desired thumbnail on an output index mark sheet, and allows a scanner of the image output apparatus 103 to read the index mark sheet, whereby the image data corresponding to the checked field can be printed out. Such a printing function using an index mark sheet is called an index mark sheet function.

Here, it is assumed that the image file storage device stores one MIF and two normal image files and that MIF settings have been made on the basis of initial settings of the image output apparatus 103 or pre-settings made by the user. In the third example of index outputting, preview display on which the MIF settings have been reflected is performed in the operation unit 211 after outputting of an index mark sheet starts. Then, the user selects whether the index mark sheet is to be output without any change or the MIF settings should be changed. After the user has performed a desired change of the MIF settings, the index mark sheet is output. Furthermore, the user makes a check in the filed of a necessary image in the index mark sheet and allows the image output apparatus 103 to scan the index mark sheet, whereby desired image outputting is realized. In the third example of index outputting, it is assumed that the image output apparatus 103 includes a document reader (scanner) not illustrated.

Figure 14:
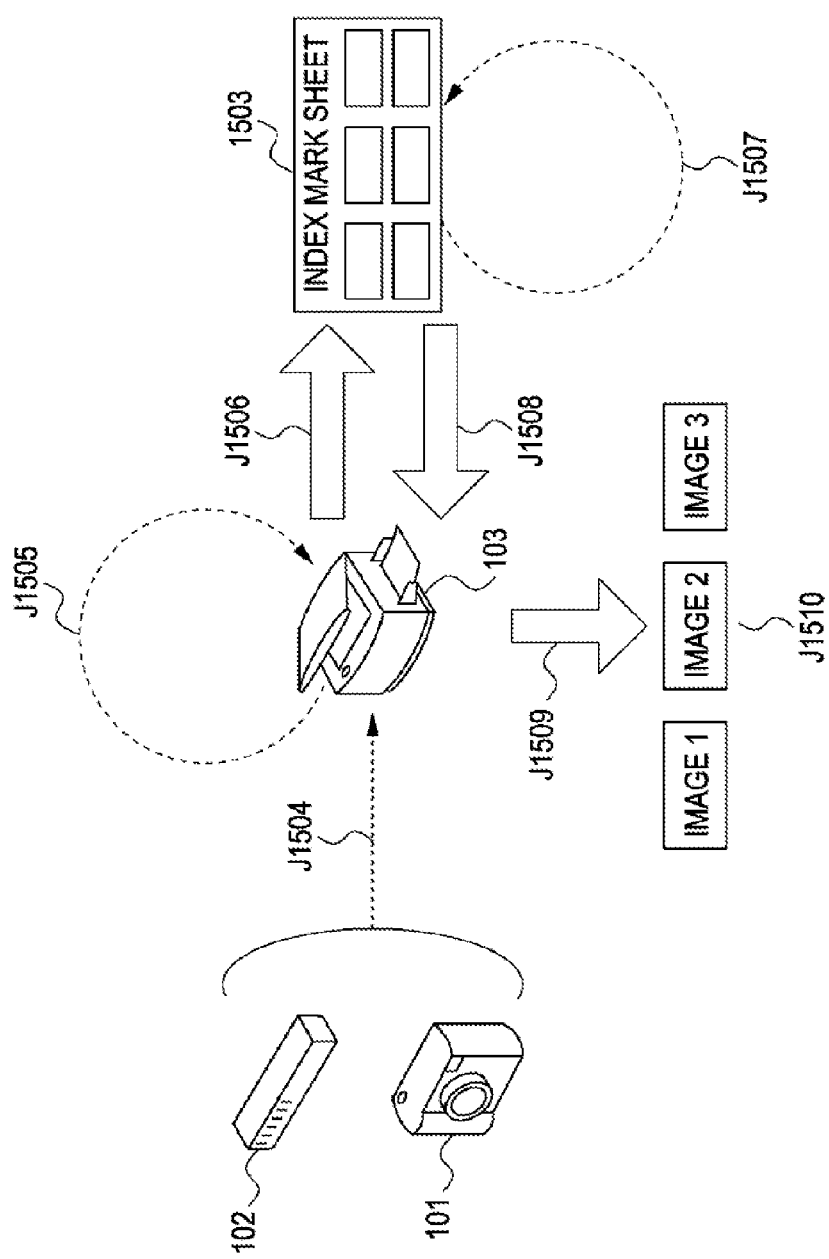
FIG. 14 illustrates a system configuration and an execution outline in a third example of index outputting.

FIG. 14 illustrates the system configuration and the outline of execution in the third example of index outputting.

Figure 15:
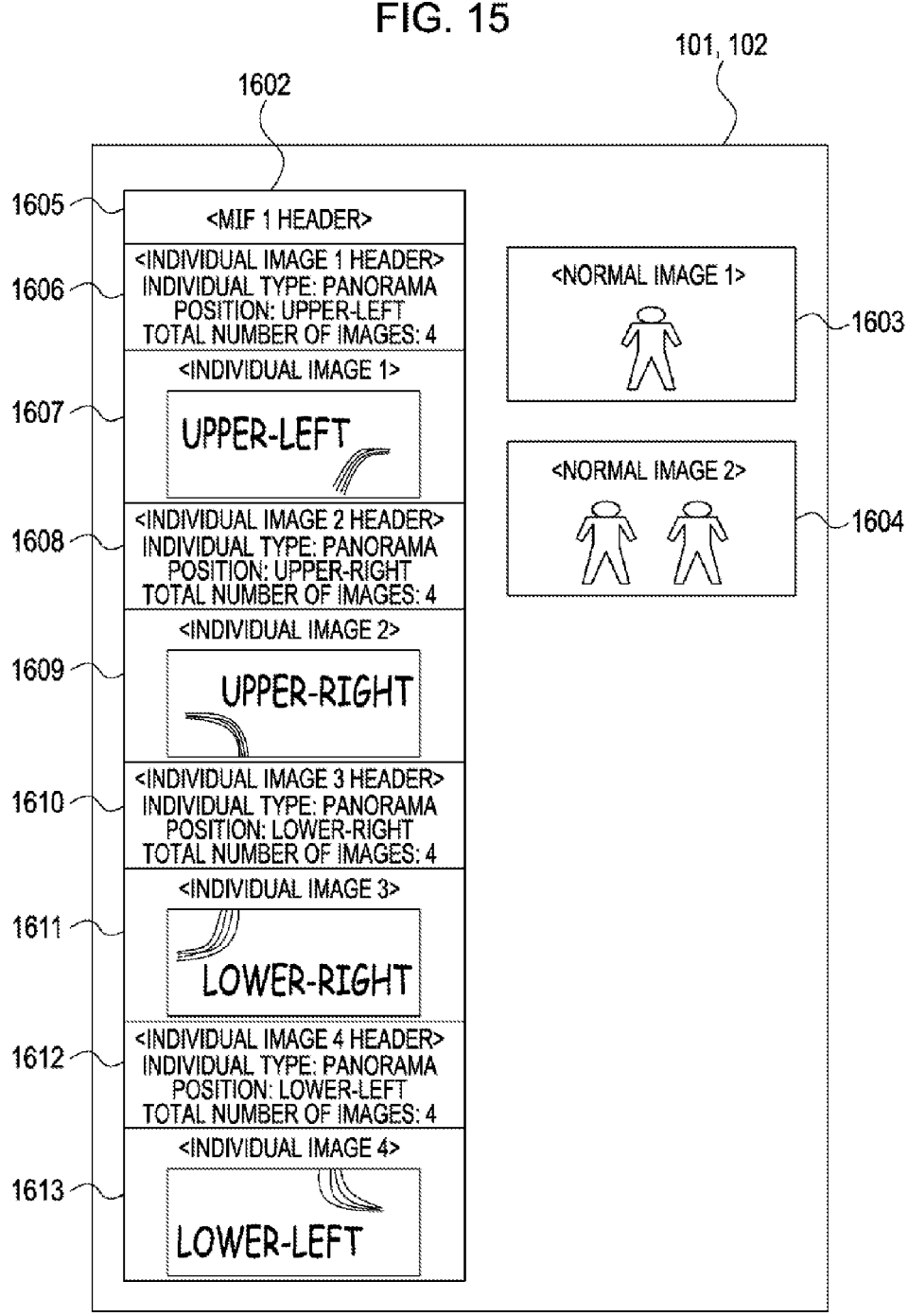
FIG. 15 illustrates a storage example of image files in an image file storage device in the third example of index outputting.

FIG. 15 illustrates a storage example of image files in the image file storage device (the digital camera 101 or the removable medium 102).

In the third example of index outputting, three image files 1602 to 1604 are stored in the image file storage device. Specifically, the three image files include two normal image files 1603 and 1604 and an MIF 1602. The MW 1602 includes an MIF header 1605, an individual image 1 header 1606, an individual image 2 header 1608, an individual image 3 header 1610, an individual image 4 header 1612, individual image 1 data 1607, individual image 2 data 1609, individual image 3 data 1611, and individual image 4 data 1613. In the individual image headers, an attribute value is held at a part different from that in FIG. 3 for easy understanding.

With reference to FIG. 14, the user connects the image file storage device to the image output apparatus 103 and starts outputting of an index mark sheet by using the UI of the image output apparatus 103 (J1504). The realization of the index mark sheet function by the image output apparatus 103 is based on the assumption that a scanner unit is provided in the image output apparatus 103. After execution of the index mark sheet function has started, the image output apparatus 103 reflects MIF settings 1700 (FIG. 16), performs image processing on a target image file on the basis of the settings, generates image data for an index mark sheet, and performs preview display (J 1505). The user checks the preview image by using the operation unit 211 of the image output apparatus 103 and allows the index mark sheet to be printed out if a desired result is obtained (J1506). If a desired result is not obtained, the user repeats an operation of changing the MIF settings 1700 so as to allow the image output apparatus 103 to present a new preview image until a desired result can be obtained, and finally prints out an index mark sheet (J1506). Up to this point, the process is the same as that in the index outputting.

After that, in the index mark sheet function, the user makes a check for a desired image in the index mark sheet (J1507). Then, the image output apparatus 103 is allowed to scan the checked index mark sheet (J1508), thereby printing out an image with the check (J1509).

Figure 16:
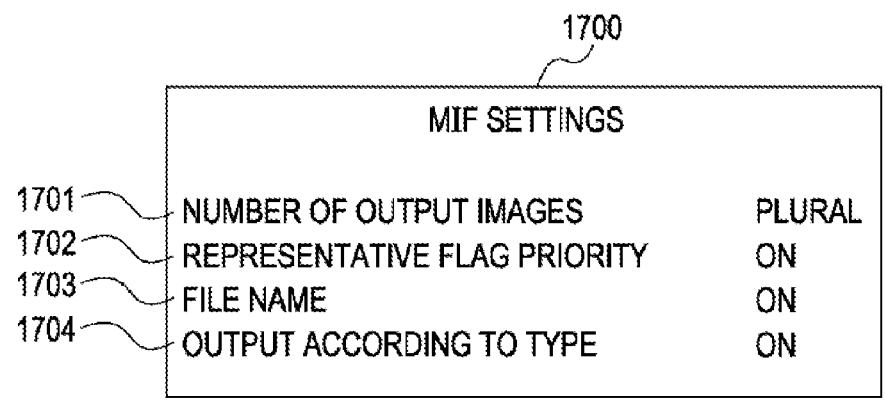
FIG. 16 illustrates an example of MIF settings in the third example of index outputting.

FIG. 16 illustrates an example of MIF settings in the third example of index outputting. In the third example of index outputting, the MIF settings 1700 includes a setting 1701 for the number of output images in a target MIF, a setting 1702 for representative flag priority, a setting 1703 for file names, and a setting 1704 for output according to type. The settings 1701, 1702, and 1703 are the same as the settings 602, 603, and 605 illustrated in FIG. 6. The setting 1704 for output according to type is a setting of whether a layout according to type is to be performed for a special type of image that can be set for an MIF. An example of the special type of image includes a panorama image in which a single image is generated by one-dimensionally or two-dimensionally joining a plurality of individual images. Another example of the special type of image includes continuous-shooting images, which are a series of images obtained by using a continuous-shooting function of the digital camera 101. Still another example of the special type of image includes multi-view images, which are a plurality of images obtained by shooting a subject from multiple viewpoints. When the setting 1704 for output according to type is "OFF", images are arranged in the same order as that of the other target images to be output as an index.

Figure 17:
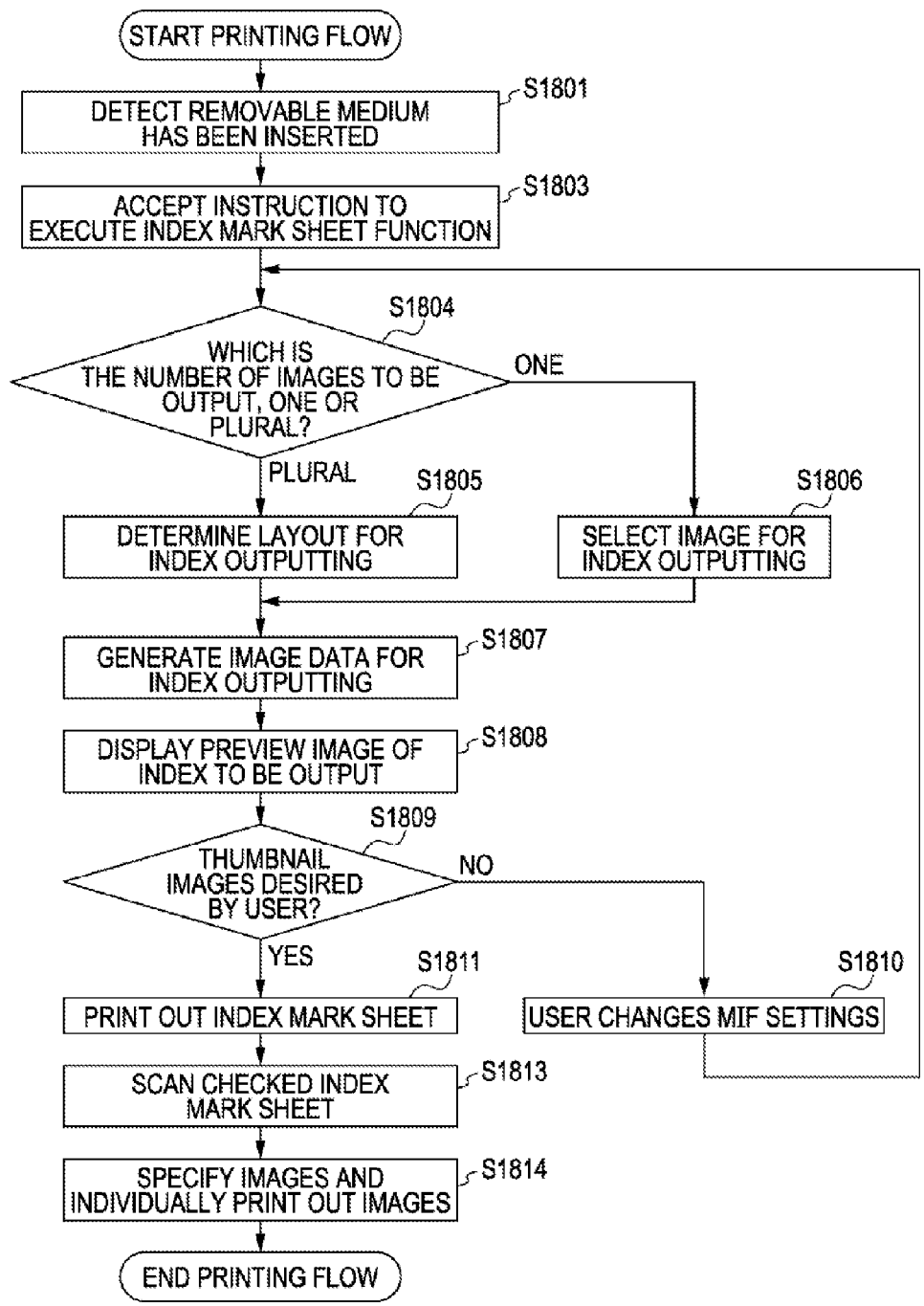
FIG. 17 is a flowchart illustrating a process performed by the image output apparatus in the third example of index outputting.

FIG. 17 is a flowchart illustrating an example of a process performed by the image output apparatus 103 in the third example of index outputting. The process of this flowchart is executed by the CPU 201 of the image output apparatus 103.

First, in step S1801, a user inserts the removable medium 102 into the image output apparatus 103 in a state where the image files 1602 to 1604 exist in the removable medium 102, and then the process proceeds to step S1803. Step S1801 corresponds to the foregoing J1504.

In step S1803, an instruction to start execution of the index mark sheet function is accepted from the user.

In step S1804, the number of target images to be output in the MIF is determined. Specifically, the number is determined on the basis of the setting 1701 for the number of output images in the MIF settings 1700. If the number is plural, the process proceeds to step S1805. If the number is one, the process proceeds to step S1806.

In step S1805, when the number of images to be output in the target MIF is plural and when the MIF includes a special type of image, the layout for outputting the MIF as an index is determined on the basis of the setting 1704 for output according to type in the MIF settings 1700.

Now, a description is given about a case where the MIF includes a panorama image as an example of the special type of image. In the panorama image, the positions of images and an attribute value indicating the total number of images are set in the individual image headers 1606, 1608, 1610, and 1612. When the setting 1704 for output according to type is "ON" and when the type of image is a panorama image, the layout of images is determined on the basis of information indicating the positions of the images in the individual image headers of the panorama image. For example, the MIF 1602 illustrated in FIG. 15 includes a panorama image of 2×2 arrangement. Thus, the positions in the 2×2 arrangement for outputting the individual images as an index are determined with reference to the individual image headers. After reflection of those settings, the process proceeds to step S1807.

On the other hand, in step S1806, when the MIF includes a plurality of individual images, an individual image to be output as an index is determined. The image is determined according to the method of preferentially selecting an individual image in which a representative flag is set. This method has been described above in the first example of index outputting.

In step S1807, the image output apparatus 103 generates image data for index outputting by using the data stored in the image file storage device 102. Then, the process proceeds to step S1808.

In step S1808, a preview image of an index to be output is displayed in the operation unit 211. Then, the process proceeds to step S1809.

In step S1809, if an operation input indicating "OK" is accepted from the user via the operation unit 211, the process proceeds to step S1811. On the other hand, if an operation input indicating "NG" is accepted from the user via the operation unit 211 in step S1809, the process proceeds to step S1810. In step S1810, an operation screen for changing the MIF settings is displayed in the operation unit 211, and an instruction to change the MIF settings from the user is accepted. Then, the process returns to step S1804, and the process for outputting an index is repeated. Steps S1803 to S1810 correspond to the foregoing J1505.

On the other hand, in step S1811, image data for outputting of the respective image files displayed in the preview is printed as an index mark sheet. Step S1811 corresponds to the foregoing J 1506.

In step S1813, the index mark sheet in which the user has made a check is scanned. Step S1813 corresponds to the foregoing J1508.

In step S1814, pieces of image data selected by the user are specified on the basis of the information generated through the scanning performed by the image output apparatus 103, and the specified images are individually printed out. Step S1814 corresponds to the foregoing J1509.

Figure 18:
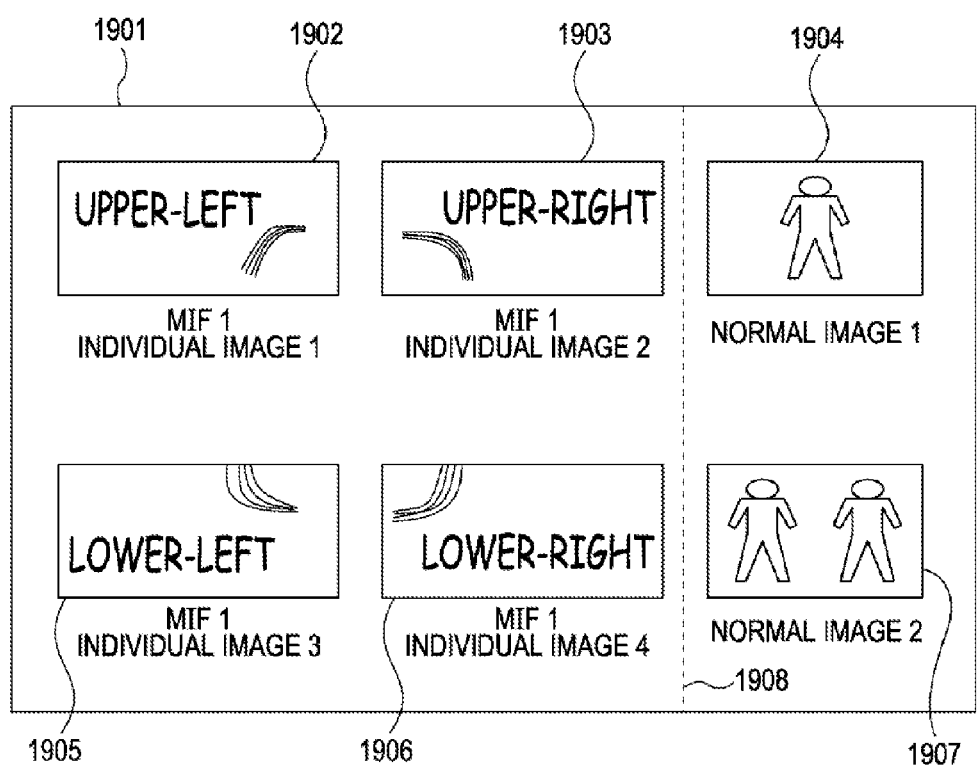
FIG. 18 illustrates an example of an output index mark sheet in the third example of index outputting.

FIG. 18 illustrates a printout example 1901 of the index mark sheet 1503 output in step S1811 (J1506), layout display being applied thereto.

The selected pieces of image data are printed as thumbnails 1902 to 1907. The thumbnails 1904 and 1907 are based on the normal image files 1603 and 1604 illustrated in FIG. 15. The thumbnail 1902 is an image in the MIF 1602. The thumbnails 1902, 1903, 1905, and 1906 are individual images constituting a panorama image, and are placed so that a single image can be reproduced by joining the individual images on the basis that the setting for output according to type is "ON" in FIG. 16. Also, an appropriate partition line 1908 between the panorama image and the normal files is output on the index mark sheet. Accordingly, the user can distinguish the MIF from the normal image files.

In the third example of index outputting, a description has been given about a panorama image as an example of a special type of image. In a case of continuous-shooting images, the size of thumbnails of the individual images may be adjusted so that the individual images are placed within the sheet even when the images are one-dimensionally arranged. In a case of multi-view images, thumbnails may be arranged at the positions corresponding to multi-view shooting positions. In the third example of index outputting, a description has been given about an example of outputting an index mark sheet. In a case of performing index printing as in the first and second examples of index outputting, too, an arrangement of thumbnails according to this embodiment can be applied to a special type of image.

As described above, according to the third example of index outputting, an index that is visually recognizable for the user can be output by appropriately determining the positions of thumbnails in a case of a special type of image, such as a panorama image.

In the first to third examples of index outputting, images for index outputting may be generated by reducing data of normal images or individual images. When a thumbnail image is stored in an image header, the thumbnail image may be used.

In the first to third examples of index outputting, the MIF settings 601, 1101, and 1700 may be made by a user in advance as initial settings of the image output apparatus 103, or may be made by a user at execution of index printing. Alternatively, data of the settings may be held in the digital camera 101, and the data may be transferred from the digital camera 101 to the image output apparatus 103 when the digital camera 101 is connected to the image output apparatus 103, whereby the settings may be made in the image output apparatus 103.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-272132, filed Oct. 22, 2008, which is hereby incorporated by reference herein in its entirety.

The invention claimed is:

1. An image output apparatus comprising:
    a storage unit configured to store setting information for index outputting, the setting information being applied to a first-type image the including a plurality of pieces of image data among a plurality of image files as a target of the index outputting, wherein the plurality of pieces of image data included in the first-type image file includes an initial piece of image data and representative image data, the initial piece of image data being specified by an initial flag and the representative image data being specified by a representative flag included in the first-type image file;
    a setting unit configured to set a priority setting for preferentially selecting image data provided with a representative flag as target image data for the index outputting;
    a selecting unit configured to select a piece of image data specified by the representative flag among the plurality pieces of image data included in the first-type image file in a case where an image file as a target of the index outputting is the first-type image file and the setting unit sets the priority setting; and
    an output unit configured to perform the index outputting based on a plurality of pieces of image data including the selected piece of image data,
    wherein, in a case where the representative flag is not added to any of the pieces of image data included in the first-type image file or the setting unit dose not set the priority setting, the selecting unit selects an initial piece of image data from the first-type image file.

2. The image output apparatus according to claim 1,
    wherein the specific information includes information indicating an initial piece of image data among the plurality of pieces of image data included in the first-type image file.

3. The image output apparatus according to claim 1,
    wherein, in a case where the plurality of image files include the first-type image file and an other-type image file, the output unit performs the index outputting by distinguishing an image based on the first-type image file from an image based on the other-type image file.

4. The image output apparatus according to claim 3,
    wherein the output unit performs the index outputting by adding an image for
    distinguishing the image based on the first-type image file from the image based on the other-type image file.

5. The image output apparatus according to claim 4, wherein the output unit distinguishes the image based on the first-type image file from the image based on the other-type image file by adding an image forming a frame around the image based on the first-type image file.

6. The image output apparatus according to claim 1, further comprising:
    an operation unit configured to include a display unit that displays an operation screen and accept an input of an operation instruction from a user,
    wherein the index outputting performed by the output unit includes displaying on the display unit based on a plurality of pieces of image data including the piece of image data selected by the selecting unit.

7. The image output apparatus according to claim 6, further comprising:
    a changing unit configured to change the setting information in response to acceptance of an instruction to change the setting information from a user via the operation unit after the output unit has performed the index outputting to the display unit,
    wherein the output unit performs the index outputting again based on the changed setting information.

8. The image output apparatus according to claim 7, wherein the selecting unit changes pieces of image data for the index outputting performed again by the output unit among the plurality of pieces of image data included in the first-type image file based on the setting information changed by the changing unit.

9. The image output apparatus according to claim 1, wherein the output unit performs printout on a sheet based on a plurality of pieces of image data including the piece of image data selected by the selecting unit.

10. The image output apparatus according to claim 9, wherein the output unit performs the printout by adding an image of a check field to each of the reduced images in the index outputting.

11. The image output apparatus according to claim 10, further comprising:
a document reading unit configured to read a document,
wherein an image corresponding to the check field that is checked is specified on a sheet obtained through the index outputting, the sheet being read by the document reading unit, and the specified image is printed out.

12. An image output method in an image output apparatus that includes a storage unit configured to store setting information for index outputting, the setting information being applied to a first-type image file including a plurality of pieces of image data among a plurality of image files as a target of the index outputting, wherein the plurality of pieces of image data included in the first-type image file includes an initial piece of image data and representative image data, the initial piece of image data being specified by an initial flag and the representative image data being specified by a representative flag included in the first-type image file, the image output method comprising:
setting a priority setting for preferentially selecting image data provided with a representative flag as target image data for the index outputting;
selecting a piece of image data specified by the representative flag among the plurality pieces of image data included in the first-type image file in a case where an image file as a target of the index outputting is the first-type image file and the setting sets the priority setting; and
performing the index outputting based on a plurality of pieces of image data including the selected piece of image data, except an initial image data, having a representative flag and an attribute value indicating a number of images,
wherein priority of performing the index outputting is based on the representative flag.

13. A non-transitory storage medium storing a control program causing an image output apparatus to execute an image output method, the image output apparatus including a setting information storage unit configured to store setting information for index outputting, the setting information being applied to a first-type image file including a plurality of pieces of image data among a plurality of image files as a target of the index outputting, wherein the plurality of pieces of image data included in the first-type image file includes an initial piece of image data and representative image data, the initial piece of image data being specified by an initial flag and the representative image data being specified by a representative flag included in the first-type image file, the image output method comprising:
setting a priority setting for preferentially selecting image data provided with a representative flag as target image data for the index outputting;
selecting a piece of image data specified by the representative flag among the plurality pieces of image data included in the first-type image file and the setting sets the priority setting; and
performing the index outputting based on a plurality of pieces of image data including the selected piece of image data, except an initial image data, having a representative flag and an attribute value indicating a number of images,
wherein priority of performing the index outputting is based on the representative flag.

* * * * *